United States Patent [19]
McShane

[11] Patent Number: 5,117,996
[45] Date of Patent: Jun. 2, 1992

[54] ELECTRICAL BOX EXTENSION

[76] Inventor: William J. McShane, 5909 Ridge Ave., Philadelphia, Pa. 19128

[21] Appl. No.: 741,742

[22] Filed: Aug. 7, 1991

Related U.S. Application Data

[63] Continuation-in-part of Ser. No. 596,740, Oct. 12, 1990, Pat. No. 5,042,673, which is a continuation of Ser. No. 370,710, Jun. 22, 1989, abandoned.

[51] Int. Cl.$^5$ ............................................. H02G 3/08
[52] U.S. Cl. ...................................... 220/3.7; 174/57
[58] Field of Search ............... 220/3.2, 3.7, 3.9, 3.92, 220/3.6; 174/57

[56] References Cited

U.S. PATENT DOCUMENTS

| | | | |
|---|---|---|---|
| 1,693,396 | 11/1928 | Littleton | 220/3.6 X |
| 1,862,324 | 6/1932 | Struad | 220/3.7 |
| 2,378,861 | 6/1945 | Peevey | 220/3.7 X |
| 2,531,698 | 11/1950 | Petrick et al. | 220/3.7 X |
| 2,590,391 | 3/1952 | Elmore | 220/3.6 |
| 2,989,206 | 6/1961 | McAfee | 220/3.7 |
| 3,433,886 | 3/1969 | Myers | 220/3.7 X |
| 3,651,245 | 3/1972 | Moll | 220/3.7 X |
| 3,720,783 | 3/1973 | Moll | 220/3.7 X |
| 4,019,647 | 4/1977 | Arnold | 220/3.6 X |
| 4,634,015 | 1/1987 | Taylor | 220/3.7 |
| 5,042,673 | 8/1991 | McShane | 220/3.7 |

Primary Examiner—Steven M. Pollard
Attorney, Agent, or Firm—Paul & Paul

[57] ABSTRACT

An improved electrical box extension can be used to easily and securely mount an electrical device, such as a switch or electric outlet, flush with a new surface installed over an existing surface, using an existing electrical box which is fixed within the existing surface. The electrical box extension comprises a generally tubular body sized to receive an electrical device, and to be received within an existing electrical box. The body has flanges extending outwardly, and depth adjustment screws extend between the flanges and attachment bars mounting the electrical box extension on the existing electrical box. The body and adjustment screws can be used with an electrical box having integral attachment bars.

13 Claims, 3 Drawing Sheets

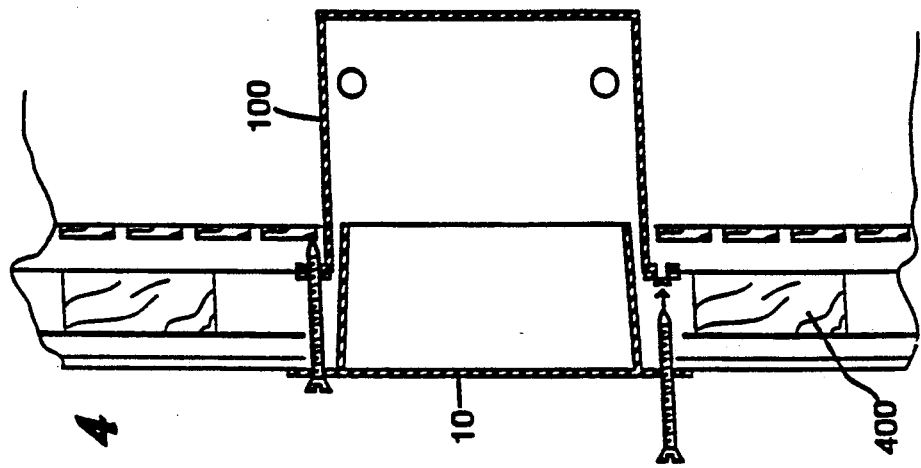
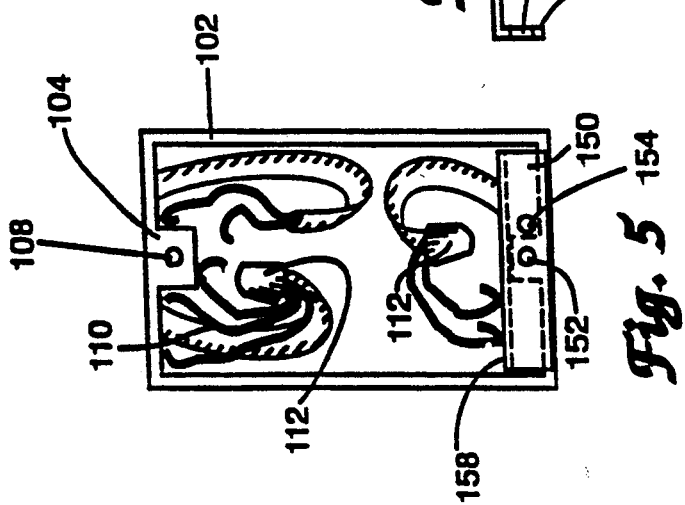

ELECTRICAL BOX EXTENSION

This is a continuation-in-part of copending U.S. Pat. application Ser. No. 07/596,740, filed Oct. 12, 1990, now U.S. Pat. No. 5,042,673 which is a continuation of Ser. No. 07/370,710, filed Jun. 22, 1989, now abandoned.

BACKGROUND OF THE INVENTION

1. Field of the Invention

This invention relates generally to electrical equipment, and more specifically to means for housing electric devices such as switches and outlets.

2. Brief Description of the Prior Art

Electrical boxes formed from sheet metal or plastic materials are widely used for housing electrical devices such as switches, outlets, and the like, and for permanently mounting such devices in walls, ceilings or floors. Typically such boxes are anchored by nailing or otherwise permanently affixing the box, or a bracket on which such a box can be mounted, to a structural element such as a wall stud a ceiling or floor joist or the like. Once the box has been mounted in this manner, it is very difficult to remove or reposition. The box is usually mounted so that its outward, open face is flush with the surface, such as a wall, in which it is mounted. After mounting the box, wiring is brought into it for connection to the electrical device which it is intended to house. The function of the box is to provide a means of mounting the electrical device, and to isolate the electrical device from its environment to reduce potential electrical shock and fire hazards.

As new housing becomes increasingly expensive, the rehabilitation and remodeling of existing housing becomes increasingly attractive. Often older housing which is to be reconditioned has walls and ceilings which have numerous esthetic and/or structural deficiencies. It is frequently desirable to install new sheet stock, such as sheetrock, foam insulation, or laminated "paneling," directly over the existing surfaces, rather than remove the existing walls and ceilings first. When this is done, holes can be cut for existing switch and outlet boxes. However, when the new sheet stock has been installed, the existing boxes are no longer flush with the surface, but rather are set back in the surface by the thickness of the new sheet stock. For esthetic and practical reasons, the electrical devices, including switches and outlets, must be positioned at the surface. However, the existing boxes can no longer adequately serve their protective function, since the portion of the electric device extending between the surface and the box will be exposed to the surrounding sheet material. Actually moving the box so that its face is flush with the new surface is not practical, since this would likely entail disconnecting the device from its associated wiring and extensive additional labor.

The prior art has approached this problem by fashioning box extentions of two different general types. The first type has walls of the same general configuration as the box to be extended, and of a fixed depth or thickness. The extension is simply screwed onto the existing box, and the electrical device is screwed onto the extention. Although this type of extension is available is a variety of thicknesses or depths, the fact that the thickness is fixed is often a disadvantage, since several layers of new sheet stock may be installed, and the resulting surface will frequently lie at some non-standard height above the original surface.

The second type of extension has a body which slidably extends within the existing box and relies on a friction fit with the interior surface of the existing box for mounting. This type of extension may not provide a secure mounting for the installed electrical device. For example, an outlet may be pushed back into the wall in which it is mounted when an electrical plug is forcefully inserted. Worse still, when a plug is repeatedly removed and reinserted, the outlet may be alternately pulled and pushed, stressing and loosening the wires supplying power to the outlet.

There is a need for an electrical box extension which can be used to safely and securely mount an electrical device, such as a switch or outlet, flush with a new surface on an electrical box fixed in an underlying existing surface, and in new construction there is a need for a new, integerally adjustable electric box to correct the alignment of the box which is set crooked, out too far, or too deep.

SUMMARY OF THE INVENTION

The present invention provides an improved electrical box extension which can be used to easily and securely mount an electrical device such as a switch or electric outlet, flush with a new surface installed over an existing surface, onto an existing electrical box which is fixed within the existing surface.

The electrical box extension comprises a generally tubular body having at least one wall and a first open face and a second open face. The body is sized to receive an electrical device, such as a switch or an electrical outlet, and to be received within an existing electrical box having an open face and at least one wall. The at least one wall of the body extends proximate to and generally parallel to the at least one wall of the electrical box. The body has at least two flanges extending outwardly from at least one wall proximate the first open face of the body. Each flange includes at least one threaded aperture for mounting the electrical device and at least one additional aperture.

The electrical box extension further comprises at least two attachment bars for mounting the electrical box extension on the existing electrical box. Each attachment bar includes an aperture for screwing the bar to a flange extending from the existing electrical box. Each attachment bar further includes at least one additional aperture, which may be threaded for use with threaded attachment means or unthreaded for use with self-tapping attachment means. The additional apertures of the attachment bars are aligned with the additional apertures of the body flanges when the electrical box extension is assembled.

In addition, the electrical box extension further includes a plurality of parallel depth adjustment means or screws extending between the body flanges and the attachment bars. Each depth adjustment means extends through one of the additional apertures of the flanges, and also extends through and is rotatably mounted in a respective one of the additional apertures of an attachment bar. Inward rotation (i.e. clockwise for right-handed threads) of each of the depth adjustment means causes the body to move toward the electrical box on which the electric box extension is mounted. In this way, the flanges of the extension can be secured against an existing or new surface in which the electrical box is mounted, even if the box itself is located behind or beneath the existing or new surface.

The attachment bars can be made integral parts of a new electrical box for new construction so that the body of the electrical box extension can be mounted onto the new electrical box by aligning the adjustment screws attached through the additional apertures in the flanges.

Electrical boxes with the extension attached are helpful in present drywall installation and in future remodeling, when walls and ceilings are to have insulation, tile, or other sheet goods applied, and this installation leaves the electrical outlets set too deep. By securing the adjustment screws the extension will be secured flush against the new surface.

BRIEF DESCRIPTION OF THE DRAWINGS

FIG. 4 is a side sectional view showing the electrical box extension of FIG. 1 assembled onto an existing electrical box which has become recessed in a wall after application of a new surface on the wall.

FIG. 5 is a side elevational view of an attachment bar employed in one embodiment of the electrical box extension of the present invention.

FIG. 5a is a front elevational view showing the attachment bar of FIG. 5 mounted on the electric box extension of FIG. 1.

DETAILED DESCRIPTION OF THE PREFERRED EMBODIMENTS

Figure 1:
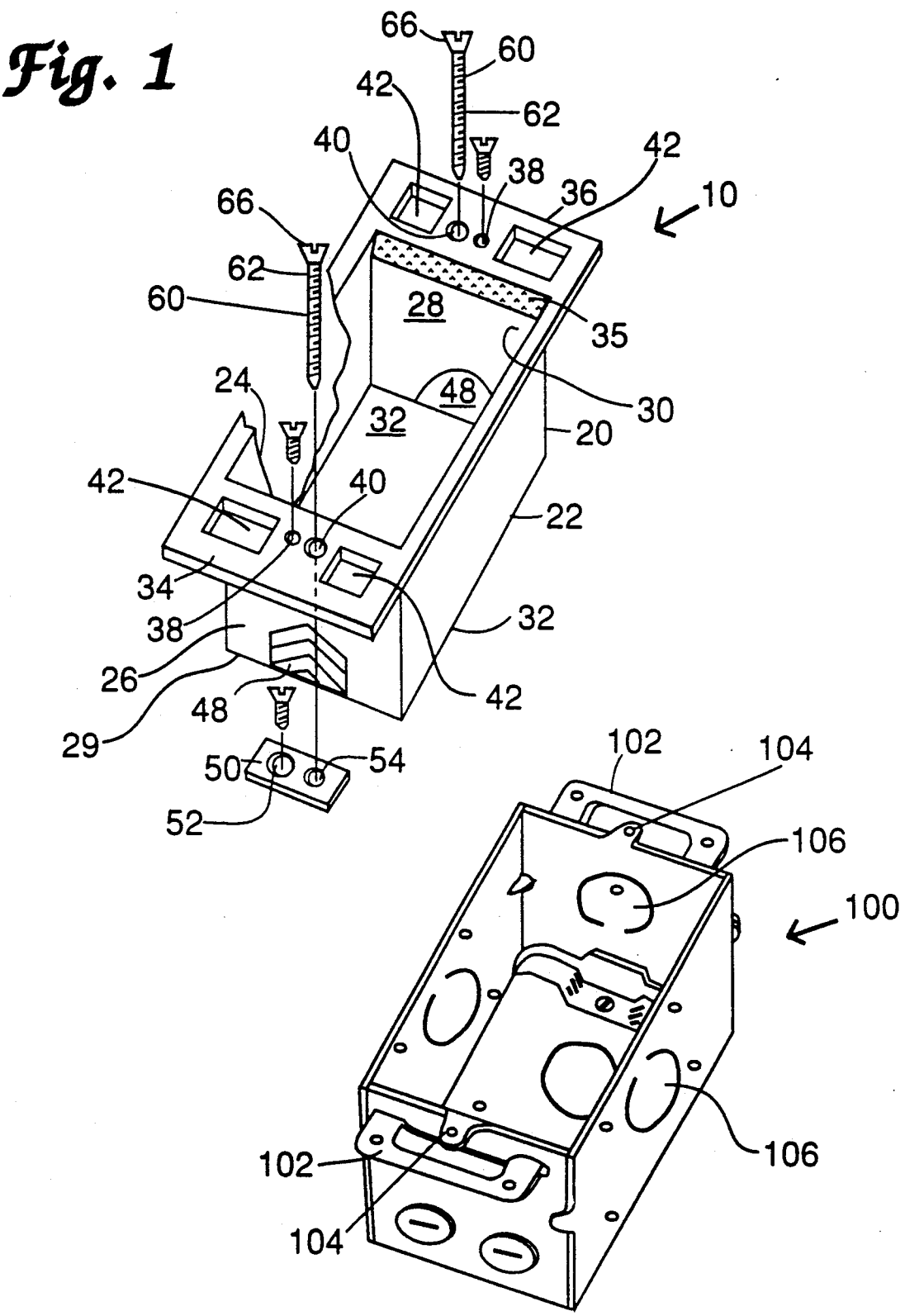
FIG. 1 is an exploded perspective view of a presently preferred embodiment of the electrical box extension of the present invention.

Referring now to the drawings in detail, wherein like reference numerals indicate like elements in each of the several views, reference is first made to FIG. 1, wherein an improved electrical box extension 10 according to the present invention is shown in an exploded perspective view.

The electrical box extension 10 is to be mounted on an existing electrical box 100 of conventional generally rectangular design, of the type commonly formed from sheet metal and adapted for mounting a single electrical switch or outlet intended to receive a pair of appliance plugs or the like. The box 100 is enclosed on four sides and at the back with generally rectangular walls which are adaptable to running electrical wire or cable therethrough and an open face for receiving the electrical device to be mounted therein. The box 100 has two sets of opposed flanges 102, 104 (an inner set 104 and an outer set 102) extending outwardly from opposite sides of the box 100 proximate the open face of the box 100. The outer set 102 can be used to position the box 100 in the wall, ceiling or floor in which it is to be mounted, and each flange of the inner set 104 includes an aperture adapted to receive a screw for mounting the electrical device (not shown) in the box 100.

Typically electrical box extensions of the present invention will be useful after one or more additional sheets of material or the like have been applied over the existing surface in which a box 100 is already mounted, and the electrical device must be positioned outwards from the existing box 100, such as shown in the sectional view of FIG. 4. This situation frequently arises in remodeling and rehabilitation of older, existing structures, when new surfacing materials are installed over older walls, ceilings, or the like, which may be severely cracked or otherwise damaged. In new work the sheetrock tends to be relatively straight but the framing members may be irregular, causing electrical boxes to be positioned too far inward, or too far outward, rather than at the surface of the sheetrock. When installing the new materials, holes are made to be positioned over existing electrical boxes, such as shown in FIG. 4.

The improved electrical box extension 10 shown in FIG. 1 includes a generally tubular or conical body 20 having two sets of two equally dimensioned, generally parallel, generally rectangular walls 22, 24 and 26, 28. The body 20 has a first or front open face 30 and a second or rear open face 32 of generally like dimensions.

Preferably, opposed pairs of walls 22, 24 and 26, 28 are slightly closer together at the rear face 32 than at the front face 30, to give a body 20 which tapers inwardly and which can easily be inserted into the open face of an existing electrical box, and is less likely to be obstructed by rough edges, indentations, out-of-line knockouts, broken-off or short screws, or the like. Similarly, it will be easier to position such a body 20 in some types of older plastic electrical boxes which have slightly conical or tapering bodies themselves.

Extending outwardly from each of a pair of walls 26, 28 and generally perpendicular to those walls 26, 28 proximate the open face 30 are flanges 34, 36 for mounting the first body 20 to the electrical box 100 and for mounting an electrical device (not shown) onto the body 20. The flanges 34, 36 each have a central, threaded aperture 38 positioned for attaching the electrical device to the body 20 by screws. In addition, the flanges 34, 36 each include an additional aperture 40 to be used in mounting the body 20 to the electrical box 100. The edge 35 formed between the flanges 34, 36 and the respective walls 26, 28 is chamfered or cut away to ease the fit of certain electrical devices within the body 20. The flanges 34, 36 also include a plurality of cutouts 42 for observing the alignment of the extension 10 and its components as the extension is being installed.

The electrical box extension 10 also includes a pair of generally rectangular attachment bars 50 each having a central aperture 52 for attaching each bar 50 to a respective interior flange 104 of the electrical box 100. Each attachment bar 50 also includes an additional aperture 54 spaced so as to be alignable with the additional aperture 40 of the body flanges 34, 36 when the electrical box extension 10 is assembled or installed. The additional apertures 54 can be threaded or can be unthreaded, depending on whether the means for attaching the body to the bars are self-tapping. Alternatively, electrical boxes can be manufactured having flanges or other structural features (not shown) including additional apertures to receive depth adjustment screws for mounting tubular bodies of the present invention.

In addition, the electrical box extension 10 also includes two depth adjustment means or screws 60 each having a threaded lower portion 62 adapted to extend through the additional apertures 40 of the body flanges 34, 36, and to be received by the additional apertures 54. Each depth adjustment means 60 also has a slotted head 66. The additional apertures 40 in the body flanges 34, 36 are not threaded and are slightly larger than the diameter of the threaded lower portion 62 of the adjustment screws 60, but smaller than the diameter of the head 66. The additional apertures 54 of the attachment bars 50 are threaded to engage the threads of the lower portions 62 of the adjustment screws 60.

Figure 3:
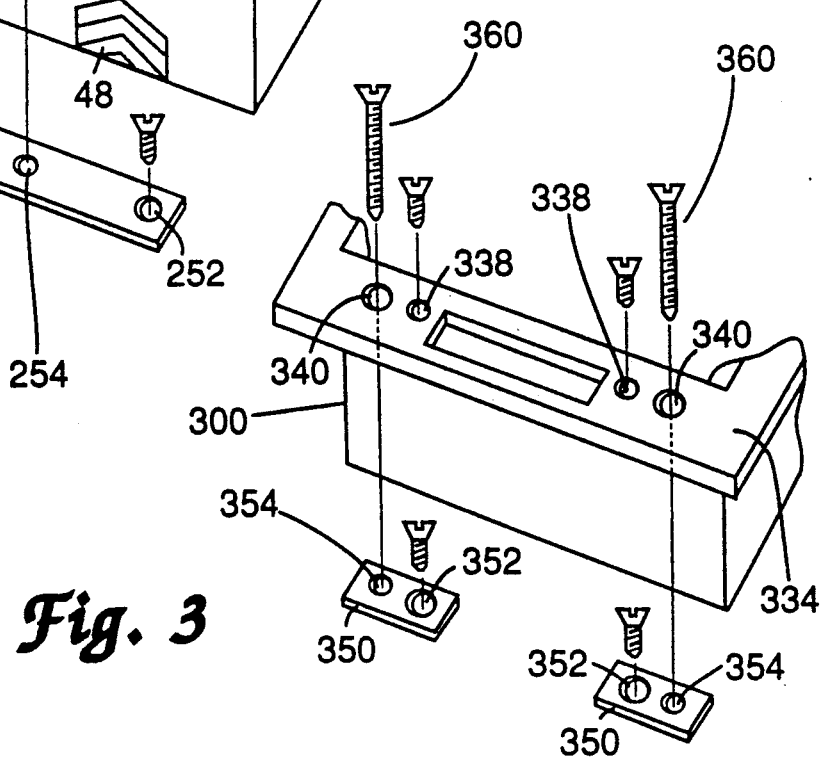
FIG. 3 is a fragmentary perspective view of third embodiment of the electrical box extension of the present invention.

As best seen in FIG. 1, when the electrical box extension 10 is assembled, the depth adjustment screws 60 extend in parallel between the body 20 and the attachment bars 50. Each depth adjustment screw 60 is then pushed through one of the additional apertures 40 and extends through and is rotatably mounted in a respective one of the additional apertures 54 of an attachment bar 50. The cutouts 42 in the body flanges 34, 36 aid in sighting the additional apertures 54 in the attachment bars 50 and in aligning the depth adjustment screws 60. Inward rotation with a screwdriver (not shown) of each of the depth adjustment screws 60 causes the body 20 to move into the electrical box 100. When the electrical box extension 10 is assembled, such as shown in FIG. 3, each of the walls 22, 24, 26, 28 of the body 20 extends proximate to and generally parallel to a corresponding wall of the electrical box 100.

In some cases, wires will extend through one of the "knockouts" 106 formed in the side of an already installed electrical box (not shown). The extension body 20 includes a plurality of knockouts 48 formed in the walls 22, 24, 26, 28 thereof. One or more of the extension body knockouts 48 can be removed in those cases where there are wires extending through respective knockouts 106 in the electrical box 100, so that inward movement of the extension body into the box 100 during installation will not be hindered by contact of the inner edge 29 of one of the walls 22, 24, 26, 28 with such a wire, and wire will instead pass through the both the box knockout 106 and the extension body knockout 48 when the extension 10 has been installed.

FIG. 4 illustrates an electrical box extension 10 according to the present invention affixed to an electrical box 100 permitting installation of an electrical device (not shown) flush with a new surface 400 of an old stud wall, the box 100 lying under the new surface.

Figure 2:
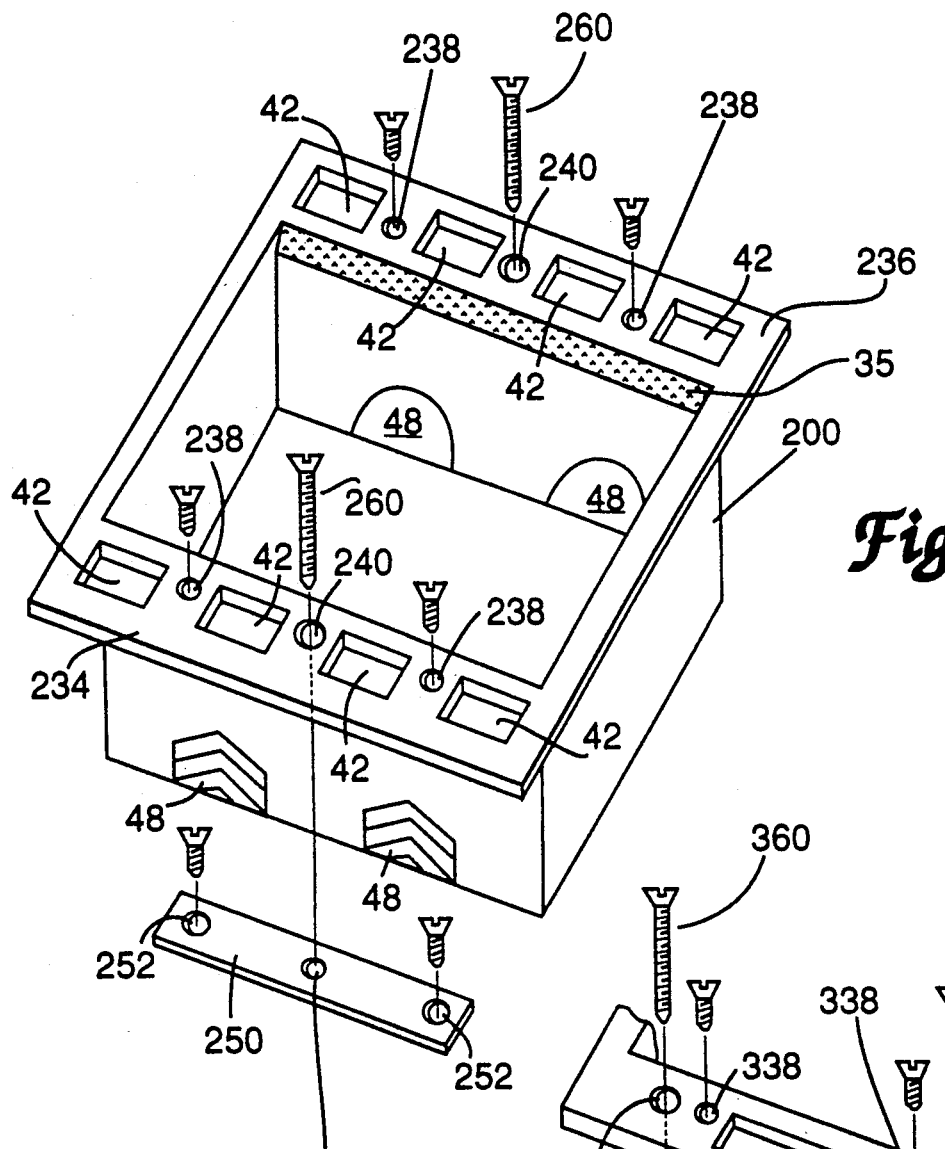
FIG. 2 is an exploded perspective view of a second embodiment of the electrical box extension of the present invention.

The electrical box extension of the present invention can be manufactured for use with an electrical box of any shape or dimensions. For example, circular or cylindrical boxes can be extended. Similarly, boxes adapted to receive multiple electrical devices can be extended by box extensions having suitable dimensions. FIG. 2 shows another embodiment of the present invention including a body 200 adapted to extend an electrical device box intended to mount two switches or outlets. The body 200 includes a pair of opposed flanges 234, 236 in which are found two pairs of threaded apertures 238 for mounting a pair of electrical devices (not shown) side by side. Each flange 234, 236 has a single, centrally positioned additional aperture 240 through which extends a single depth adjustment means or screw 260 for securing the body 200 to a respective attachment bar 250. Each respective attachment bar 250 (only one of which is visible in FIG. 2) has a pair of apertures 252 positioned to align with the electrical device-mounting apertures in a double electrical box (not shown). The attachement bars 250 are secured to a double electrical box (not shown) by screws extending through the aligned apertures 252. In addition, the attachment bars 250 include central threaded additional apertures 254 for receiving the depth attachment means 260 for securing the body 200 to the double box.

Yet another embodiment of the present invention for use in extending multiple electrical boxes is shown in FIG. 3. In this case the body 300 has flanges 334 which include both a pair of apertures 338 for mounting a pair of electrical devices (not shown) as well as a pair of additional apertures 340 for receiving a pair of depth adjustment means 360 for securing the body 300 to a pair of attachment bars 350. Each attachment bar 350 includes an aperture 352 for securing the bar 350 to an electrical box (not shown), as well as an additional aperture 354 for receiving the depth adjustment means 360.

The extension body can be formed integrally, such as in a single molding or casting, when made from a thermoformable material, or as when diecut as a single sheet and bent to shape. Alternatively, the body can be assembled from a plurality of individual pieces. Similarly, the "attachment bars" can be molded or formed as integral parts of the box. Such boxes can be provided alone, or together with or partially assembled with electrical box extensions of the present invention for use in new construction or the like.

As can be seen in FIG. 5, some types of electrical boxes 102 have inwardly extending tabs 197 having threaded apertures 108 for mounting electrical devices (not shown). In such cases, when an an electric box extension of the present invention is employed, the depth adjustment means or screws, which are typically formed from metal, may extend deep inside the box where they may contact one or more of the electrical conductors or wires 110 contained within the box 102. The electrical conductors 110 are typically stripped of insulation proximate their ends and joined electrically and mechanically with wire nuts 112, with the portion of the conductor 110 extending outside the wire nut 112 retaining an insulative jacket. However, occasionally the conductor end may come loose when the electrical device is installed, or too much insulative jacket may be stripped from the end so that bare wire extends from the nut 112. In order to guard against accidental contact of the depth extension means with such exposed conductors in this type of box, an "L"-shaped attachment bar 150 such as illustrated in FIGS. 5 and 5a can be used. This attachment bar 150, in addition to a threaded aperture 154 for receiving the depth adjustment means (not shown) and an aperture 152 for securing the bar 150 to the box 102, each formed in a first planar section 156 of the bar 150, also includes a second planar section 158 (as shown in FIG. 5a), extending perpendicular to the first section 156. When the bar 150 is attached to the box 102, this second section 156 physically and electrically separates the conductors 110 from the depth adjustment means (not shown) extending into the box 102.

In addition to their use in extending electrical boxes, the extension devices of the present invention can be used to extend a wide variety of other types of fixtures which are normally mounted in or extend through a surface when a new surface is applied over an old surface. For example, by altering the shape and dimensions of the generally tubular body, fixtures such as fan housings, phone jacks, heating and air conditioning ducts, rubbish and laundry chutes, manholes, and the like, can be so extended.

various modifications can be made in the details of the construction and use of the various embodiments of the electrical box extension of the present invention, all within the spirit and scope of the appended claims.

I claim:
1. An electrical box extension comprising:
   a) a generally tubular body having at least one wall and a first open face and a second open face, the body being sized to receive an electrical device and to be received within an electrical box having an open face and at least one wall, the at least one wall extending proximate to and generally parallel to the at least one wall of the electrical box, the body having at least two flanges extending outwardly from at least one wall proximate the first open face, each flange including at least one aperture for mounting the electrical device and at least one additional aperture;

b) at least two attachment bars for mounting the electrical box extension on an existing electrical box, each attachment bar including an aperture for screwing the bar to a flange extending from the existing electrical box, each attachment bar further including at least one additional aperture, the additional apertures of the attachment bars being aligned with the additional apertures of the body flanges; and c) a plurality of parallel depth adjustment means extending between the body flanges and the attachment bars, each depth adjustment means having a threaded portion, each depth adjustment means extending through one of the apertures of the flanges, and extending through and being rotatably mounted in a respective one of the additional apertures of an attachment bar, such that inward rotation of each of the depth adjustment means causes the body to move toward an electrical box on which the electric box extension is mounted.

2. An electrical box extension according to claim 1 wherein the body is formed from sheet metal.

3. An electrical box extension according to claim 1 wherein the body is formed from a plastic material.

4. An electrical box extension according to claim 1 wherein the attachment bars are formed from sheet metal.

5. An electrical box extension according to claim 1 wherein the attachment bars are formed from a plastic material.

6. An electrical box extension according to claim 1 wherein the open faces of the body are generally rectangular.

7. An electrical box extension according to claim 1 wherein the attachment bars including a pair of perpendicular sections, the first section including the aperture for attaching the bar to the electrical box and the additional aperture for receiving the depth adjustment means, the second section extending within the electrical box when the bar is attached to the box, the second section physically and electrically separating a volume within the box in which the attachment means extend from the remaining volume of the box.

8. An electrical box extension according to claim 1 wherein the tubular body comprises four rectangular walls including a pair of opposed end walls bearing outwardly directed flanges, the end walls being attached by two side walls.

9. An electrical box extension according to claim 8 wherein each flange includes a plurality of threaded apertures for mounting a respective plurality of electric devices, the extension being adapted for use with electrical boxes mounting a plurality of electrical devices.

10. An electrical box extension according to claim 9 wherein each flange includes two threaded apertures.

11. An electrical box extension extension according to claim 1 wherein the tubular body is assembled from a plurality of sides.

12. An electrical box extension according to claim 1 wherein the body flanges each include at least one cutout for observing alignment of a respective depth adjustment means in a respective attachment bar.

13. An electrical box extension according to claim 1 wherein the body include at least one knockout to be removed so that the body does not contact an obstruction extending through the side of an electrical box as the extension is being installed.

* * * * *